May 24, 1927.  1,629,972
W. R. ROYER
AUXILIARY VALVE FOR PNEUMATIC TIRE VALVE STEMS
Filed Aug. 30, 1923

Inventor
William R. Royer
By his Attorneys
Cooper, Kerr & Dunham

Patented May 24, 1927.

1,629,972

UNITED STATES PATENT OFFICE.

WILLIAM R. ROYER, OF WILKES-BARRE, PENNSYLVANIA.

AUXILIARY VALVE FOR PNEUMATIC-TIRE VALVE STEMS.

Application filed August 30, 1923. Serial No. 660,066.

This invention relates to auxiliary valves for pneumatic tire valve stems, particularly devices of the class described in United States Patent No. 1,304,116, issued to T. J. Stephens, May 20, 1919, and its chief object is to provide an improved device which is convenient in use and thoroughly effective and which can be manufactured at reasonable cost. To these and other ends the invention comprises the novel features hereinafter described.

Figure 1:
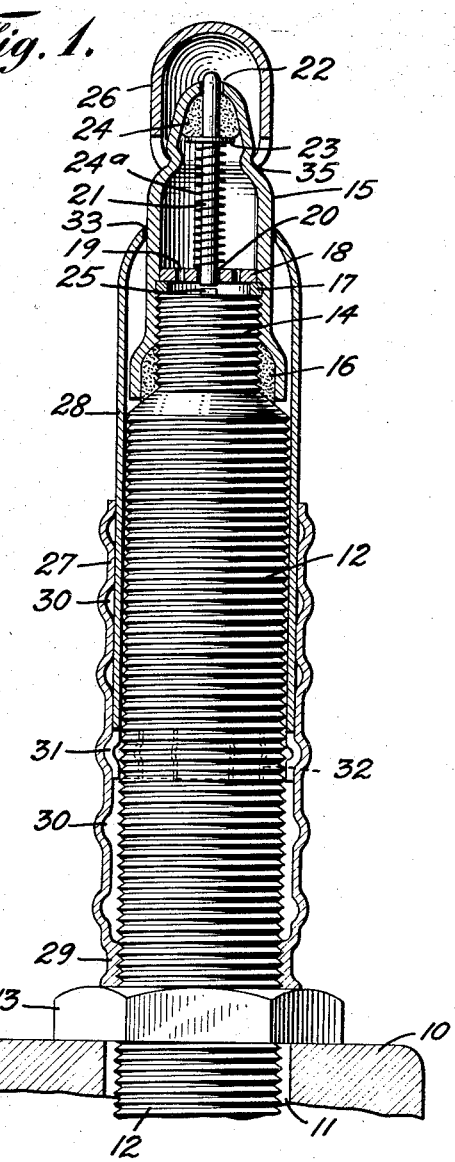

The preferred embodiment of the invention is shown in the accompanying drawing, in which Fig. 1 is a longitudinal section illustrating my improved auxiliary valve in use on a valve stem.

Figure 2:
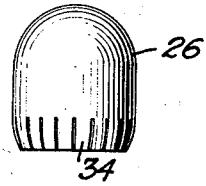

Fig. 2 is a detail side view of the preferred form of top-cap provided for the auxiliary valve.

In the drawing, 10 is the felly of an automobile wheel, having an opening 11 for the valve stem 12 of the conventional form, which is threaded throughout its length to receive the nut 13 commonly used to exclude dirt, water, and other foreign matter from the hole 11. At its top or outer end the valve stem is reduced in diameter to provide the threaded nipple 14. Screwed down on the nipple is an internally threaded cap or casing 15, flared at its lower end to receive a compressible or yielding washer or gasket 16. In the cap is a similar washer or gasket 17, mounted in a circumferential groove and extending inwardly beyond the inner surface of the cap so as to be seated firmly on the upper edge of the nipple 14 when the casing 15 is screwed down, and also to provide a shoulder or rib as a support for the septum or disk 18. The latter is provided with air openings 19, and with a central aperture 20 for the rod or plunger 21 which also projects through an opening 22 in the top of the cap 15. Just below the opening 22 the plunger 21 is equipped with a disk or flange 23, fixed thereon, and on the disk is a yielding washer or packing 24. A coil spring 24$^a$ encircling the reciprocatory rod 21, and bearing on disks 18 and 23, holds the washer or gasket 24 snugly in the tapered upper end of the cap, and holds the rod up out of engagement with the tire-valve plunger 25, which may be a part of any suitable valve, not shown. A removable cap 26, described hereinafter, is shown on the auxiliary valve chamber 15.

To inflate the tire it is only necessary to apply the air-hose nozzle (the cap 26 being removed) to the end of the cap 15. This depresses the auxiliary valve plunger 21 and the valve-head 24, thereby opening a passage for the compressed air. At the same time the plunger 21 depresses the valve plunger 25, thereby opening the tire valve. When the air hose is removed the spring 24$^a$ raises the plunger or rod 21, jamming the valve head 24 snugly into its tapered seat and permitting the plunger 25 to rise and close the tire valve.

The washers or gaskets 16, 17 and 24 may be made of any suitable material. 16 and 17 are preferably made of soft metal and 24 of soft rubber.

To cover and protect the unsightly threads on the valve stem 12 I provide a casing composed of a pair of telescoping tubular members or shells 27, 28, the first having an inner flange 29 at its lower or inner end, threaded to screw down on the valve stem and seat firmly on the nut 13. Member 28 fits snugly but smoothly inside of the other, and the two are preferably so proportioned, as to diameter and thickness, that the inner surface of member 28 is close to or in contact with the valve stem. The outer member is provided with a series of inner circumferential grooves, 30, and the inner is formed at its lower end with a circumferential rib 31 to cooperate with the aforesaid grooves. Its lower end may also be slotted upwardly, as shown at 32, to provide a suitable member of ribbed, inwardly yielding tongues, as will be readily understood. The upper or outer end of member 28 has an opening 33 to receive the auxiliary valve casing 15.

In assembling the sleeves or members 27, 28, the two are adjusted together to bring the rib 31 into the particular groove 30 which will give the whole a suitable length, such, for example, as will bring the outer end of sleeve 28 about half way up the cap 15. In making this adjustment the spring tongues at the end of sleeve 28 yield or flex as the rib 31 passes between the successive grooves. The casing formed by the two sleeves is then screwed down upon the valve stem as in Fig. 1. If now the annular space between the valve stem and the inner sleeve is less than the thickness of the rib 31 the sleeve cannot be pulled out of the outer sleeve, for the reason that the spring tongues cannot yield inwardly far enough to permit the locking rib 31 to be disengaged from the groove in which it is seated. The casing formed by the two sleeves therefore cannot be lengthened or shortened without unscrewing the same from the valve stem at least far enough to bring the inner end of the inner sleeve above the shoulder on the lower part of the auxiliary valve chamber 15; the net result being that when fitted on the valve stem the two sleeves are in effect one. The casing is, however, adjustable in length to fit stems which protrude different distances through the felly.

If necessary or desirable to protect the upper end of the auxiliary valve chamber 15 and the projecting end of the plunger 21 a cap may be provided therefor, for example the cap 26. As shown in Fig. 2 the lower edge of the cap is bent inwardly and is slotted axially to form spring tongues 34 for engagement with an outer circumferential groove 35 in or at the base of the taper on the outer end of the valve chamber 15. Preferably the cap is made of metal thick and stiff enough to prevent removal of the cap by a straight pull, and requiring it to be "rocked" off by a rather firm pressure laterally against its upper end, the taper of the end of the valve casing being made flat or blunt enough to permit such method of removal. The cap is preferably no greater in outside diameter than the middle portion of the valve casing, so that the sleeves 27, 28 can be removed and replaced when desired without removing the cap. I also prefer to make the flared lower end of the valve casing smaller in outside diameter than the valve stem 12, to permit removal and replacement of the nut 13 without removing the valve casing.

It is to be understood that the invention is not limited to the construction herein specifically illustrated and described but can be embodied in other forms without departure from its spirit.

I claim:

1. In a valve for pneumatic tires, a tubular member carrying a valve and adapted to be attached to the outer end of a valve casing, and having an end-opening and circumferential groove adjacent to said opening; and a cap of spring metal mounted over said opening, having its edge turned inwardly and slotted axially to form spring fingers seated in said groove, the cap being removable by pressure exerted laterally thereon.

2. In a valve for pneumatic tires, a tubular member carrying a valve and adapted to be attached to the outer end of a valve casing, and having a reduced end-portion provided with an end-opening and a circumferential shoulder adjacent thereto; and a cap of spring metal mounted over the reduced end-portion having inwardly turned spring fingers around its edge to seat under said shoulder and permit removal by lateral pressure.

In testimony whereof I hereto affix my signature.

WILLIAM R. ROYER.